(12) United States Patent
Nightingale et al.

(10) Patent No.: US 6,749,419 B2
(45) Date of Patent: Jun. 15, 2004

(54) MOLD CLAMPING APPARATUS

(75) Inventors: Richard Nightingale, Woodstock, IL (US); Jeffrey Janssen, Belvidere, IL (US)

(73) Assignee: Pechiney Emballage Flexible Europe (FR)

( * ) Notice: Subject to any disclaimer, the term of this patent is extended or adjusted under 35 U.S.C. 154(b) by 3 days.

(21) Appl. No.: 10/170,769

(22) Filed: Jun. 13, 2002

(65) Prior Publication Data

US 2003/0232105 A1 Dec. 18, 2003

(51) Int. Cl.[7] ............... B29C 49/04; B29C 49/36; B29C 49/56
(52) U.S. Cl. ............ 425/532; 425/540; 425/541; 425/451.6
(58) Field of Search ............... 425/532, 540, 425/541, 451.6

(56) References Cited

U.S. PATENT DOCUMENTS

| | | | |
|---|---|---|---|
| 3,566,445 A | 3/1971 | Niklarz | 425/541 |
| 3,599,284 A * | 8/1971 | Osa et al. | 425/532 |
| 3,632,249 A * | 1/1972 | Pearson | 425/532 |
| 3,736,092 A | 5/1973 | Konig et al. | 425/451.6 |
| 3,753,641 A | 8/1973 | Turner et al. | 425/541 |
| 3,807,929 A | 4/1974 | Moore | 425/541 |
| 3,840,317 A * | 10/1974 | Koch et al. | 425/451.6 |
| 4,059,381 A | 11/1977 | Schott, Jr. | 425/451.6 |
| 4,072,458 A * | 2/1978 | Schlieckmann | 425/451.6 |
| 4,276,013 A | 6/1981 | Bazzea | 425/451.5 |
| 4,421,472 A | 12/1983 | Martin, Jr. | 425/541 |
| 4,773,845 A | 9/1988 | Nagura et al. | 425/451.6 |
| 4,943,223 A * | 7/1990 | Panaroni | 425/451.6 |
| 5,326,250 A | 7/1994 | Doudement | 425/541 |
| 5,350,291 A | 9/1994 | Kitajima | 425/451.6 |
| 5,470,592 A | 11/1995 | Steger | 425/451.9 |
| 5,603,969 A | 2/1997 | Guindani et al. | 425/451.6 |
| 6,004,490 A | 12/1999 | Tsai | 425/451.6 |
| 6,053,723 A | 4/2000 | Guiffant et al. | 425/541 |
| 6,053,724 A | 4/2000 | Eppich | 425/451.6 |
| 6,102,685 A | 8/2000 | Miura et al. | 425/541 |
| 6,390,802 B1 * | 5/2002 | Zoppas | 425/540 |

* cited by examiner

*Primary Examiner*—Robert B. Davis
(74) *Attorney, Agent, or Firm*—McDermott, Will & Emery

(57) ABSTRACT

A blow molding apparatus having a mold clamping apparatus of the clam shell type, and having a linkage controlling the opening and closing of the mold, the linkage being comprised of two links pivotally connected to each other and driven by a pneumatic or hydraulic cylinder. The links are configured to provide the cylinder with mechanical advantage so that little mold separation force is recognized at the cylinder.

20 Claims, 5 Drawing Sheets

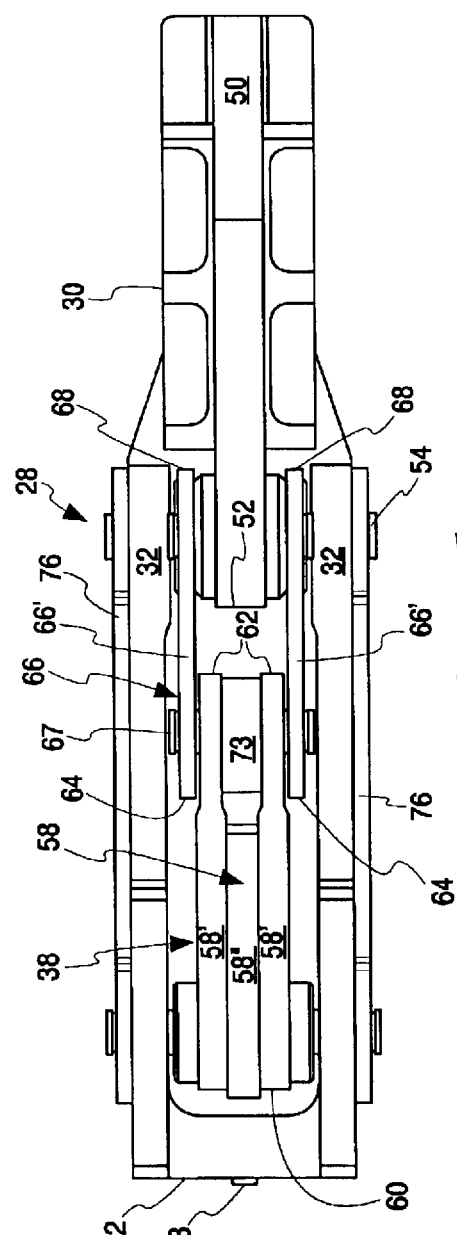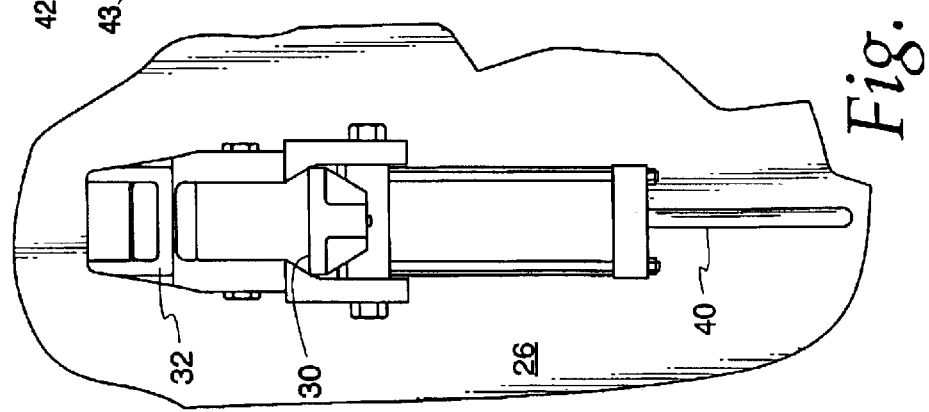

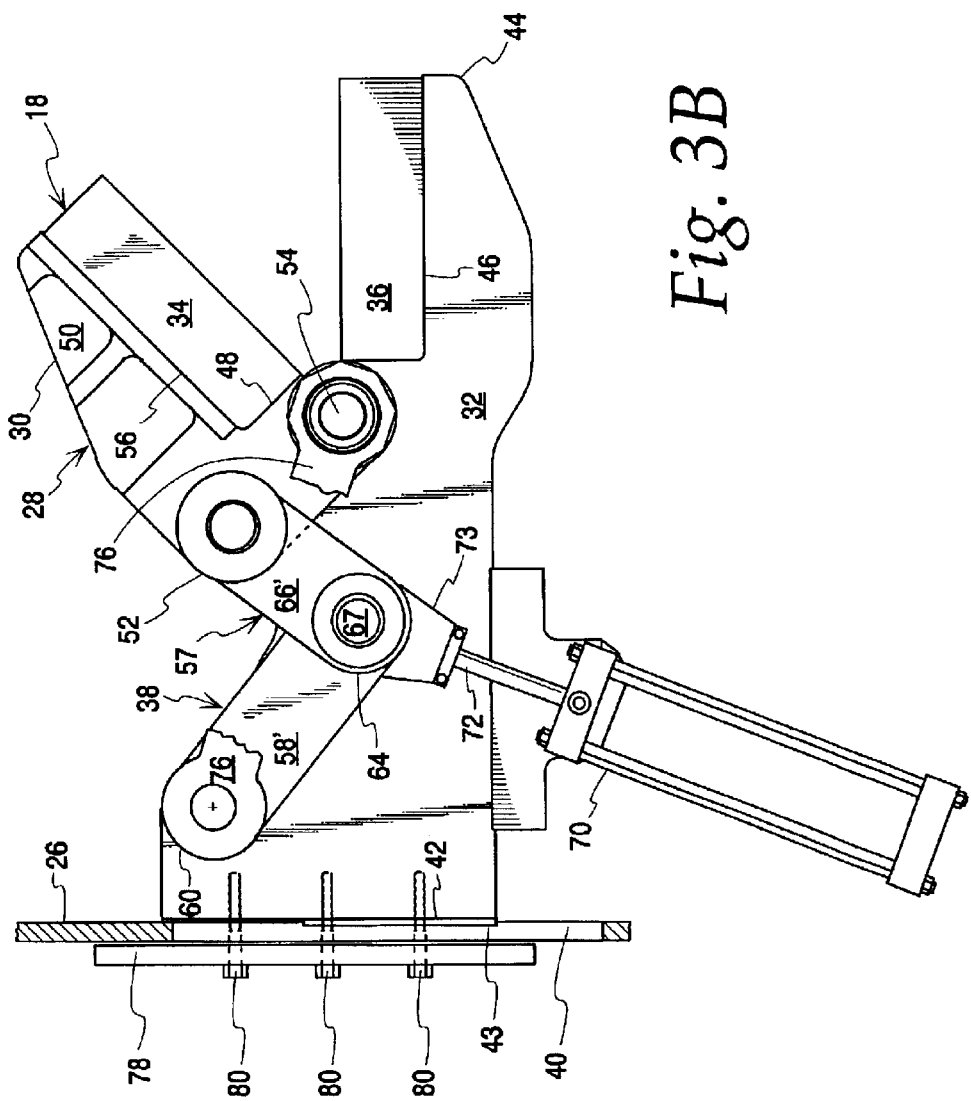

MOLD CLAMPING APPARATUS

FIELD OF THE INVENTION

The present invention relates generally to a clamping mechanism for opening and closing a mold. Specifically, the present invention relates to a toggle-type linkage mechanism for opening and closing two halves of a mold of the type employed on an extrusion blow molding wheel.

BACKGROUND OF THE INVENTION

Conventional extrusion blow molding apparatuses have typically comprised a wheel mounted on a rotating shaft with a plurality of molds positioned on the wheel about the shaft for rotating the plurality of molds past an extrusion die located adjacent to the wheel and extruding a continuous parison. Each mold typically included two mold halves each comprising a mold cavity half therein so that when the mold halves were closed the mold defined a mold cavity corresponding to the configuration of the article to be molded, such as a container. Blow molding with such an extrusion blow molding apparatus entailed rotating the wheel to move each mold, seriatim, past the extrusion die with the mold halves in an open configuration and closing the mold halves of each mold around the parison to enclose the parison within the mold. The apparatus then inserted a blowing needle into the parison within the closed mold and introduced internal pressure to the parison forcing it to inflate and conform to the configuration of the mold cavity. The molded object was then cooled and the mold opened to release the molded object from the mold.

The opening and closing of each pair of mold halves was typically controlled by a pneumatic, hydraulic or electrically driven mold clamp in which the mold halves were placed. The mold clamp consisted of a two halves, one each associated with one of the mold halves. The drive force necessary for holding the mold clamps closed was dictated by the separation force exerted on the molds by the blow air employed to inflate the parison(s) within the mold cavity. As is understood by those of ordinary skill in the art, larger molds comprised a larger surface area and typically created a larger separation force. Molds accepting multiple parisons similarly faced increased separation force based, in part, on the overall surface area of the mold and the type of mold clamp employed. A clam shell type mold clamp, as is known to those in the art, pivotally connected the two mold clamp halves at one end so that one or both of the mold clamp halves were pivoted about the pivotal connection to open and close the molds. The separation force exerted by the blow air on a clam shell type mold clamp created a separation moment about the pivotal connection of the mold clamp halves. When the clam shell type mold clamp was employed with multiple cavity molds designed to accept multiple parisons, standard physics dictated that the separation force on the mold cavity furthest from the clam shell clamp pivotal connection created a greater separation moment than mold cavity located closer to the pivotal connection; given mold cavities of identical configuration. Sufficient clamping force had to be applied to the mold clamp in order to prevent mold separation.

Typically, however, the larger clamping force necessary to counteract the large separation forces or moments created by some clamping apparatuses dictated large expensive mechanical, hydraulic, pneumatic or electrical systems capable of producing and maintaining high forces. These larger systems were often slower in response time. There is therefore a need for an improved mold clamp drive mechanism for extrusion blow molding apparatuses.

SUMMARY OF THE INVENTION

Accordingly, it is an object of the present invention to provide a wheel type extrusion blow molding machine having a mold clamp drive apparatus capable of generating a high clamp force.

It is a further object of the invention to provide a wheel type extrusion blow molding machine having a small and efficient mold clamp drive apparatus capable of generating a high clamp force.

It is another object of the invention to provide a wheel type extrusion blow molding machine having a clamp drive apparatus employing mechanical advantage to efficiently generate a high clamp force from relatively modest forces provided to the clamp drive apparatus.

It is yet another object of the invention to provide a wheel type extrusion blow molding machine having a clamp drive apparatus that holds the mold clamps together during blow molding while imposing a relatively small portion of the mold separation forces on the drive of the clamp drive apparatus.

It is an additional object of the present invention to provide a wheel type extrusion blow molding machine that relieves the necessity of a locking mechanism to absorb forces being exerted on the clamp drive apparatus during blow molding.

It is a further object of the present invention to provide a wheel type extrusion blow molding machine having a mold clamp drive apparatus capable of generating a high clamp force for a clam shell type mold clamp.

It is still a further object of the invention to provide a wheel type extrusion blow molding machine having a small and efficient mold clamp drive apparatus capable of generating a high clamp force for a clam shell type mold clamp.

It is another object of the invention to provide a wheel type extrusion blow molding machine having a clamp drive apparatus employing mechanical advantage to efficiently generate a high clamp force for a clam shell type mold clamp from modest forces provided to the clamp drive apparatus.

It is yet another object of the invention to provide a wheel type extrusion blow molding machine having a clamp drive apparatus for a clam shell type mold clamp that substantially locks the mold clamps together during blow molding and relieves the necessity of substantial force being provided to the clamp drive apparatus during blow molding.

The above objects and other objects and features of the invention will be readily appreciated by one of ordinary skill in the art from the following detailed description of the preferred embodiment for carrying out the invention when taken in connection with the following drawings.

BRIEF DESCRIPTION OF THE DRAWINGS

FIG. 2A is a front elevational view of a single mold clamp of the apparatus depicted in FIG. 1 without a mold positioned therein.

FIG. 2B is a top elevational view of the single mold clamp depicted in FIG. 2A.

FIG. 3B is a side elevational view of the mold and mold clamp depicted in FIG. 3A with the mold in a partially opened configuration.

DETAILED DESCRIPTION OF THE DRAWINGS

Figure 1:
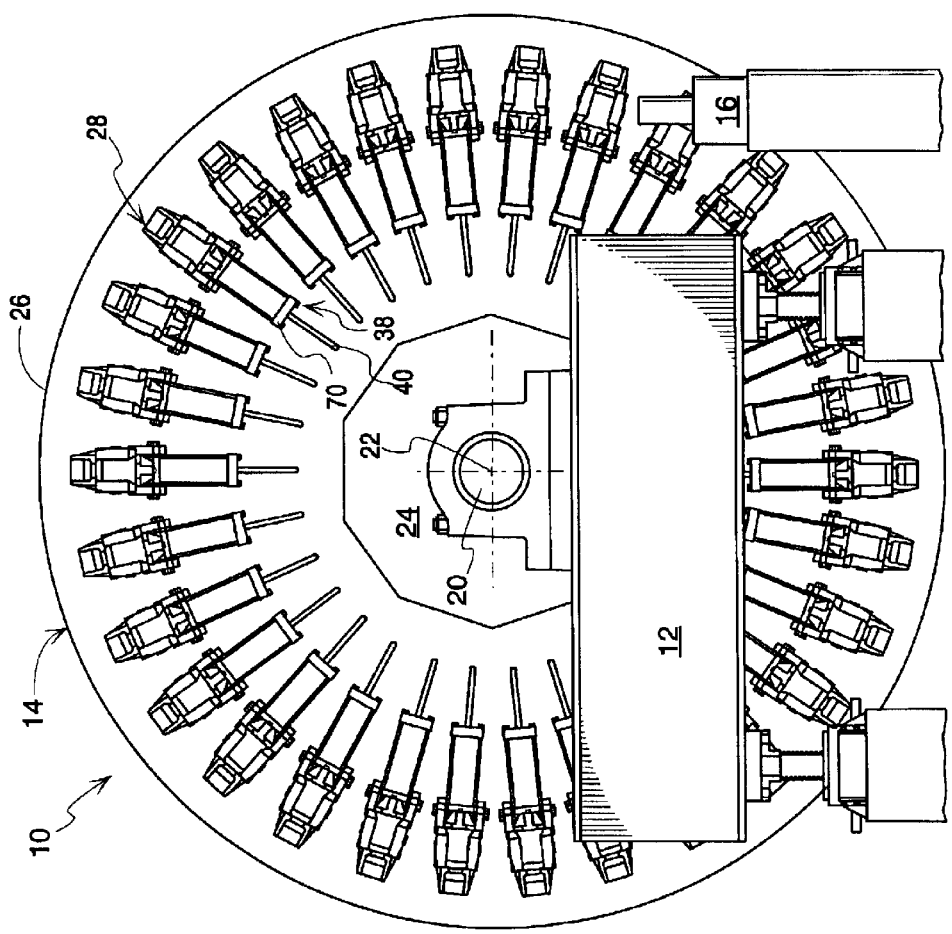
FIG. 1 is a front elevational view of a wheel type blow molding apparatus according to the present invention.

One embodiment of the present invention is depicted in FIG. 1 which shows an extrusion blow molding machine 10. The blow molding machine 10 rests on a base 12 and includes a rotatable wheel 14 and an extruder 16 positioned adjacent thereto. The wheel 14 comprises a plurality of molds 18 (see FIGS. 3A–C) each positioned within a mold clamp 28 and each mold 18 having at least one inner cavity (not depicted) to receive a parison from the extruder 16. The wheel 14 is mounted on a shaft 20 which rotates the wheel 14 and molds 18 about a rotational axis 22 of the wheel 14 and shaft 20 to direct each mold, seriatim, past the extruder 16 to receive the parison within each respective mold cavity as is standard in the art. The present invention is applicable to other types of molding apparatuses and other types of molds, such as, for example, molds having more than two pieces creating the mold cavity.

Figure 3A:
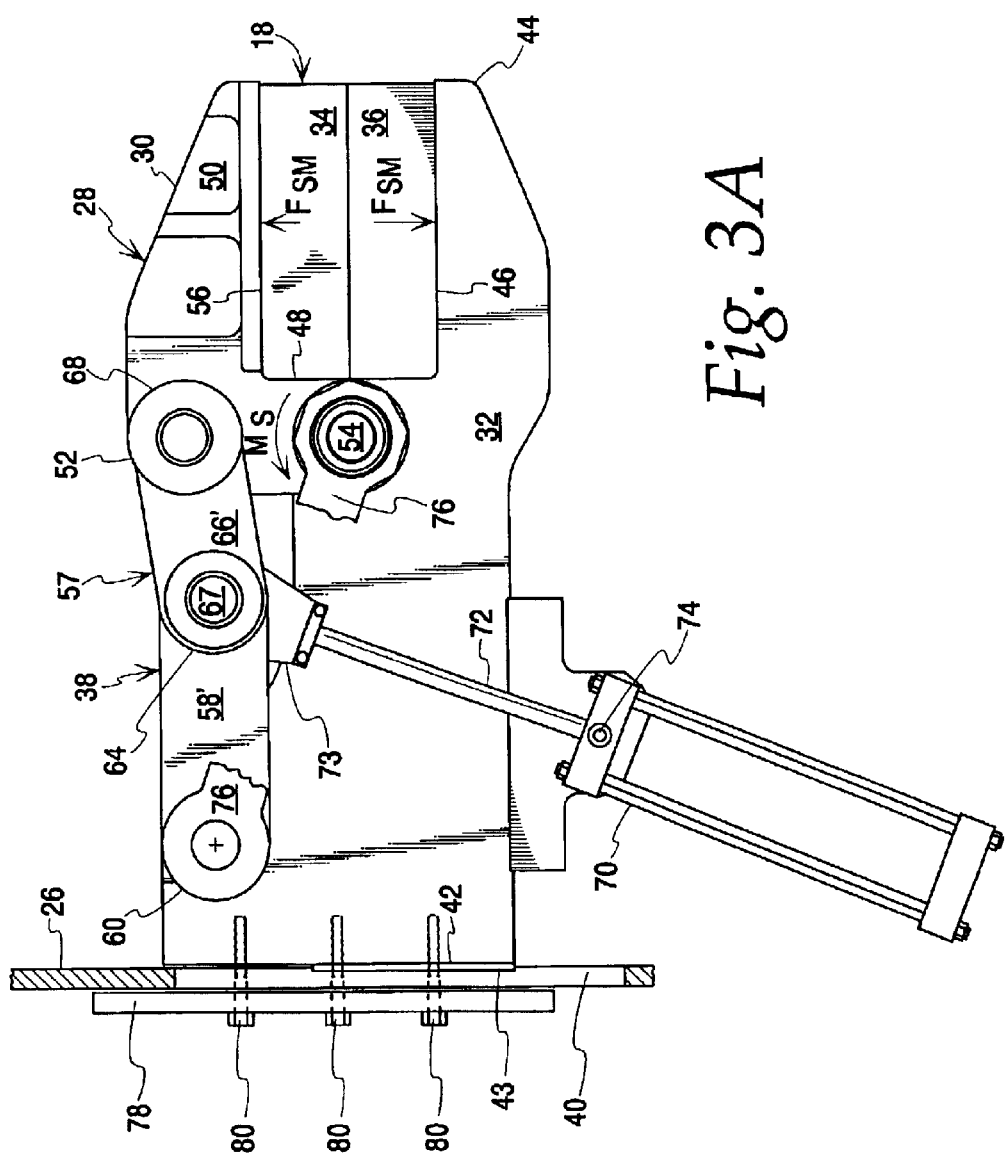
FIG. 3A is a side elevational view of the mold clamp depicted in FIGS. 2A–2B with a mold situated therein and the mold clamp holding the mold in a closed position.
Figure 3C:
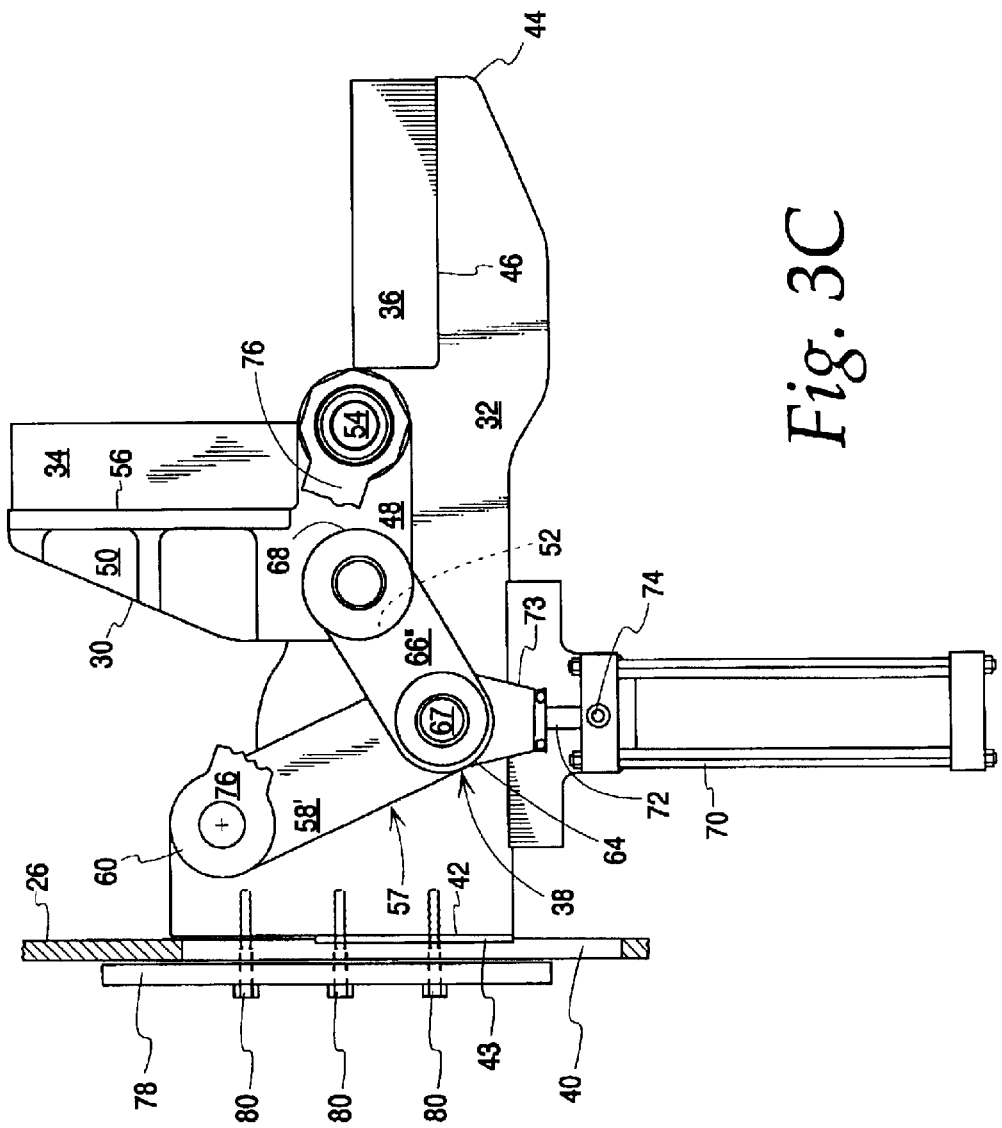
FIG. 3C is a side elevational view of the mold and mold clamp depicted in FIG. 3A with the mold in a fully opened configuration.

In the depicted embodiment, the wheel 14 comprises a hub 24 secured to the shaft 20 and a disk 26 secured to the hub 24. As best seen in FIGS. 3A–C, each of the plurality of molds 18 are mounted to the disk 26 by a dedicated mold clamp 28 which comprises a first member 30 and a second member 32, the mold clamp first member 30 having a first mold member 34 secured thereto and the mold clamp second member 32 having a second mold member 36 secured thereto by standard techniques known in the art. The position and movement of the first and second mold clamp halves 30 and 32 are controlled by a mold clamp drive apparatus 38 configured to bring together or separate the mold halves 34, 36 as required by the blowmolding process. More specifically, in the depicted embodiment, the mold clamp drive apparatus 38 drives the first mold clamp half 30 towards the second mold clamp half 32 in order to engage the first and second mold halves 34, 36, and capture the parison(s) within the one or more mold cavities. The mold clamp drive apparatus 38 then provides the necessary force to hold mold halves 34, 36 together as the parison is inflated within the mold cavity. After the parison is inflated and cooled sufficiently, the mold clamp drive apparatus 38 separates the first and second mold clamp halves 30, 32, to open the mold cavity.

The figures depict a mold clamp 28 of the clam shell type as will be understood by those of ordinary skill in the art. Other types of mold clamps are contemplated for use with the present invention. As depicted in FIGS. 3A–C, each second mold clamp member 32 is selectively secured to the disk 26 adjacent to a mounting slot 40 of the disk 26. The mounting slot 40 is radially oriented on the disk 26 as depicted in FIG. 1 with respect to the axis of rotation 22. A proximate end 42 of the second mold clamp member 32 is mounted adjacent to the disk mounting slot 40, as described below, having a mounting guide 43 protruding into the mounting slot 40. Thus configured, the second mold clamp member 32, as well as the entire mold clamp 28 and mold clamp drive apparatus 38 as described below, may be radially slid as a unit toward or away from the axis of rotation 22 as required by the width of the molds 18 to be employed with the present invention. In one embodiment, the second mold clamp member 32 is mounted to the wheel disk 26 at slot 40 by a mounted plate 78 and a plurality of bolts 80, or other securing means, as will be recognized by one of ordinary skill in the art. Other apparatus and configurations for mounting the mold clamp 28 to the wheel disk 26 are also contemplated.

The second mold clamp member 32 extends outward from the disk 26 to a distal end 44 such that the second mold clamp member 32 extends substantially parallel to the rotational axis 22 of the wheel 14. The distal end 44 of the second mold clamp member 32 comprises a second mold member seat 46 to which the second mold member 36 is selectively secured by known techniques.

The first mold clamp member 30 comprises a proximate leg 48 and a distal leg 50 joined at an angle to one another at a juncture 52. In the depicted embodiment, the proximate leg 48 and the distal leg 50 are joined at an angle of 90 degrees. The proximate leg 48 of the first mold clamp member 30 is pivotally mounted to the second mold clamp member 32 near the distal end 44 thereof at a mold clamp pivot 54. The distal leg 50 of the first mold clamp member 30 comprises a first mold member seat 56 to which the first mold member 34 is selectively secured by known techniques. Thus configured, the second mold clamp member 32 remains stationary relative to the disk 26 while the first mold clamp member 30 pivots about the mold clamp pivot 54 to engage and separate the first and second mold halves 34, 36, as dictated by the mold clamp drive apparatus 38.

The mold clamp drive apparatus 38 comprises a linkage assembly 57 having a first link 58 having a first end 60 pivotally mounted to an upper portion of the first mold clamp member 32 and a second end 62 pivotally mounted to a second end 64 of a second link 66 of the linkage assembly 57 at a linkage pivot 67. The second link 66 is, in turn, pivotally connected to the first mold clamp member 30 at a second end 68 of the second link 66. FIGS. 3A–C depict the second link 66 as pivotally connected to the first mold clamp member 30 at the juncture 52 of the first mold clamp member legs 48, 50. However, other locations of this pivotal connection are contemplated as will be apparent to one of ordinary skill in the art. In the depicted embodiment, the linkage assembly first link 58 is comprised of a pair of rods 58' connected to one another along their lengths by a web 58" as depicted in FIG. 2B. The depicted embodiment of the linkage assembly second link 66 comprises a pair of rods 66'.

The mold clamp drive apparatus 38 further comprises a drive 70 having a drive rod 72 rotatably secured to the linkage assembly 57 at the linkage pivot 67 in the depicted embodiment of the invention. In the depicted embodiment, the drive rod 72 is rotatably secured to the linkage assembly 57 at the linkage pivot 67 with a coupling 73 separating the rods of the linkage assembly first link 58. It is contemplated that the drive rod 72 may be coupled to other portions of the linkage assembly 57. The figures depict the drive 70 as a cylinder of the pneumatic or hydraulic type. However, the drive 70 may comprise any device capable of providing the linkage pivot 67 with the reciprocating motion shown and described. The drive 70 is rotatably connected to the second mold clamp member 32 at a drive pivot 74. The drive 70 may, alternatively, be mounted to other portions of the blow molding machine 10 without detracting from its ability to perform the function described herein. A brace 76 may optionally extend between the mold clamp pivot 54 and the pivotal connection of the second mold clamp member 32 to the first link 58 as depicted in FIG. 2B. The brace 76 is depicted in FIGS. 3A–C in a broken view to facilitate a clear view of the mold clamp drive apparatus 38.

As will be recognized by one of ordinary skill in the art viewing FIGS. 3A–C, retraction or protraction of the drive rod 72, in the depicted configuration of the invention, will draw the linkage pivot 67 closer to, or force the linkage pivot 67 farther from the wheel disk 26, respectively. This motion results, in part, from the rotation of the first mold clamp member 30 as displayed in FIGS. 3A–C. Because the linkage pivot 67 moves back and forth with respect to the wheel disk 26 whereas the drive pivot 74 remains stationary with respect to the wheel disk 26, the drive 70 and its drive rod 72 will rotate as depicted as the drive rod 72 is retracted or protracted by the drive 70. Other manners of accommodating the relative motion between the linkage pivot 67 and the drive 70 are also contemplated. By way of example only, the drive 70 could be slidably mounted to the second mold clamp member 32 while leaving the drive rod 72 rotatably coupled to the linkage pivot 67. It is also contemplated that the drive 70 could, alternatively, be mounted to other portions of the blow molding machine 10 and still accomplish its purpose of providing dual action drive to the linkage assembly 57.

FIG. 3A depicts one embodiment of the present invention wherein the mold 18 is in the closed position such as when a parison is captured within the one or more mold cavities (not depicted) of the mold 18. The length of the first and second links 58, 66, are configured such that they are aligned nearly parallel to one another when the mold is in the closed position as depicted in FIG. 3A. It is preferably that the first and second links 58, 66, are configured to be aligned within the range of zero to ten degrees (0°–10°), with something greater than zero degrees being most preferable, from parallel when the mold is closed. However, some benefits of the invention will be achieved at anything over zero degrees. As will be understood by those of ordinary skill in the art, standard principals of physics dictate that the closer the first and second linkages 58, 66 come to parallel when the mold 18 is closed, the less mold separation force FSM will be realized at the drive 70. That is, as the first and second links 58, 66 approach parallel, the first and second linkages 58, 66 approach a unitary brace that will absorb that component of the mold separation force $F_{SM}$ translated through the first and second links 58, 66. With the majority of the mold separation force FSM being absorbed by the first and second links 58, 66, very little of the mold separation force remains to be countered by the drive 70. Therefore, as the first and second links 58, 66 approach parallel, the component of the mold separation force FSM that must be countered by the drive 70 also approaches zero. Linkage assembly 57 of the mold clamp drive apparatus 38 thus provides the present invention with mechanical advantage minimizing the force required by the mold clamp drive apparatus 38 and thus alleviating the need for a high powered pneumatic or hydraulic system capable of absorbing the high mold separation forces associated with blow molding. The drive 70 of the present invention can be accomplished by a relatively small drive mechanism.

With less force being required from the drive 70, a lesser amount of pneumatic air or hydraulic fluid is required to protract or retract the drive rod 72. The time required to fill the protraction or retraction chamber of the drive 70 is therefore lessened and a concomitant reduction in mold opening and closing time is provided by the present invention. Variations in mold opening and closing times are also reduced, limiting production variations.

To open the mold 18, the drive 70 is activated to retract the drive rod 72 and pulling the linkage pivot 67 out from between the first ends 60, 68, of the first and second link 58, 66. This causes the first mold clamp member 30 to rotate about the mold clamp pivot 54 separating the first mold member 34 from the second mold member 36 as depicted in FIG. 3B. FIG. 3C depicts the drive rod 72 in a fully retracted position with the mold clamp 28 and the mold 18 in the most open position available. Of course, the distance that the mold 18 must open during operation of the blow molding machine 10 is dictated by the size of the product to be blown and ejected from the mold 18 and can be regulated by the magnitude of drive rod 72 retraction.

In one embodiment of the present invention, it is contemplated that the drive 70 may be achieved with a TRDAIR cylinder model no. TA-MT1X4X10-C7-MPR. It has been found that by employing this embodiment of the drive 70 with first and second links 58, 66 configured to come within ten degrees (10°) of parallel with each other when the mold 18 is closed, this configuration of the drive 70 can provide the necessary force to counter the mold separation force FSM within its design operating parameters of thirty to one hundred and fifty psi (30–150 psi). It has also been found that by configuring the drive 70 so that the drive rod 72 forms an angle of sixty-five degrees (65°) with a line connecting the first ends 60, 68, of the first and second links 58, 66, when the mold 18 is closed, the drive 70 recognizes only thirty percent (30%) of the mold separation force exerted on the mold clamp 28.

It will be understood, of course, that the form of the invention shown and described herein is not intended to illustrate all possible forms thereof. Modifications may be made to the embodiments described herein without departing from the scope of the present invention. It will also be understood that the words used herein are words of description rather than limitation, and that various changes may be made without departing from the spirit and scope of the invention as disclosed.

What is claimed is:

1. A blow molding apparatus comprising:
   a mold clamp having a first mold clamp member configured to hold a first mold member and a second mold clamp member configured to hold a second mold member, the first mold clamp member being rotatably secured to the second mold clamp member;
   a disk on which the second mold clamp member is selectively secured; and
   a mold clamp drive apparatus the mold clamp drive apparatus capable of rotating the first mold clamp member, the mold clamp drive apparatus having,
      a linkage comprising a first link having a first end pivotally secured relative to the first mold clamp member, and a second link pivotally secured to the first link, and
      a drive coupled to the linkage and secured to the second mold clamp member, but not secured to the disk.

2. The blow molding apparatus of claim 1, the second link being pivotally secured to a second end of the first link.

3. The blow molding apparatus of claim 1, the second link further being pivotally secured relative to the second mold clamp member.

4. The blow molding apparatus of claim 3, the second link being pivotally secured to the second mold clamp member.

5. The blow molding apparatus of claim 1, the drive being coupled to the pivotal securement of the first link to the second link.

6. The blow molding apparatus of claim 5, the drive further being pivotally secured relative to the second mold clamp member.

7. The blow molding apparatus of claim 1, the drive comprising a pneumatic cylinder.

8. The blow molding apparatus of claim 1 further wherein the first mold clamp member, the second mold clamp member and the mold clamp drive apparatus comprise a discrete unit capable of selectively secured to the disk via the second mold clamp member.

9. A mold clamp apparatus for a blow molding apparatus comprising:
- a mold clamp having a first mold clamp member accommodating a first mold member and a second mold clamp member accommodating a second mold member, the first mold clamp member rotatably secured to the second mold clamp member to engage and separate the first and second mold members;
- a mold clamp drive apparatus comprising a linkage comprising a first link having a first end rotatably secured relative to the mold clamp second member, a second link having a first end rotatably secured relative to the mold clamp first member, a second end of the first link being pivotally secured to a second end of the second link, and a drive coupled to the linkage and to either the first or second mold clamp member, the drive being configured to move the second ends of the first and second links,
- wherein the mold damn apparatus may constitute a discrete subassembly on a blow molding apparatus to facilitate repositioning of the mold damn apparatus with respect to the blow molding apparatus.

10. The mold clamp drive apparatus of claim 9, the drive comprising a pneumatic cylinder.

11. The mold clamp drive apparatus of claim 9, the drive being coupled to the pivotal securement of the first link to the second link.

12. The mold clamp drive apparatus of claim 9, the drive being a double action pneumatic cylinder.

13. An extrusion blow molding apparatus comprising:
- a wheel configured to rotate about a rotational axis,
- a mold clamp having a first mold clamp member and a second mold clamp member, the first mold clamp member being rotatably secured to the second mold clamp member; and
- a mold clamp drive apparatus for controlling the first mold clamp member, the mold clamp drive apparatus having,
- a linkage comprising a first link having a first end pivotally secured relative to the first mold clamp member, and a second link pivotally secured to the first link, and
- a drive coupled to the linkage and secured to the second mold clamp member.

14. The blow molding apparatus of claim 13, the second link being pivotally secured to a second end of the first link.

15. The blow molding apparatus of claim 14, the second link further being pivotally secured relative to the second mold clamp member.

16. The blow molding apparatus of claim 15, the second link being pivotally secured to the second mold clamp member.

17. The blow molding apparatus of claim 15, the drive being coupled to the pivotal securement of the first link to the second link.

18. The blow molding apparatus of claim 17, the drive further being pivotally secured relative to the second mold clamp member.

19. The blow molding apparatus of claim 13, the drive comprising a double action pneumatic cylinder.

20. The blow molding apparatus of claim 13, wherein the first mold clamp member, the second mold clamp member and the mold clamp drive apparatus comprise a discrete unit capable of being selectively secured to the wheel via the second mold clamp member.

* * * * *